United States Patent Office 3,562,111
Patented Feb. 9, 1971

3,562,111
PROCESS FOR PRODUCING 2-THIOURIDYLIC
ACID
Kiyoshi Nakayama, Sagamihara-shi, and Haruo Tanaka, Machida-shi, Japan, assignors to Kyowa Hakko Kogyo Co., Ltd., Tokyo, Japan, a corporation of Japan
No Drawing. Filed Sept. 9, 1968, Ser. No. 758,571
Claims priority, application Japan, Sept. 21, 1967, 42/60,159
Int. Cl. C12d 13/06
U.S. Cl. 195—28                                     10 Claims

ABSTRACT OF THE DISCLOSURE

A process for producing 2-thiouridylic acid by fermentation which comprises culturing a 2-thiouridylic acid-producing microorganism belonging to the genus Brevibacterium, Corynebacterium, Arthrobacter or Micrococcus under aerobic conditions in an aqueous nutrient medium. Either 2-thiouracil or 2-thiouridine is added to the medium as a precursor.

---

This invention relates to a process for producing 2-thiouridylic acid (2 - thiouracil - 1-β-D-riboflanoside-5'-pyrophosphoric acid ester). More particularly, it relates to a process for the production of 2-thiouridylic acid by fermentation. Even more particularly, the invention relates to a process for producing 2-thiouridylic acid by fermentation with microorganism strains belong to the genus Brevibacterium, Corynebacterium, Arthrobacter or Micrococcus.

2-thiouridylic acid is a ribotide of 2-thiouracil and is recovered from the RNA of the virus when tobacco mosaic virus is treated with 2-thiouracil, the latter being an inhibitor of tobacco mosaic virus. Moreover, 2-thiouridylic acid is an inhibitor of the metabolism found in the cells of *Escherichia coli* cultured by adding 2-thiouracil thereto. In the prior art, 2-thiouracil has been used as a medicine for Basedow's disease, heart attacks and congestive heart diseases. It has also been used as an accelerator for increasing the weight of animals by adding it to the fodder thereof.

One of the objects of the present invention is to provide an improved process for the production of 2-thiouridylic acid which overcomes the disadvantages and deficiencies of the prior-art methods.

Another object of the present invention is to provide a process for producing 2-thiouridylic acid by fermentation which may be carried out in an efficacious and simple manner.

A further object of the invention is to provide a process for producing 2-thiouridylic acid by fermentation which may be carried out advantageously on an industrial scale at low cost to give a high yield of product.

A still further object of the invention is to provide 2-thiouridylic acid.

These and other objects and advantages of the present invention will become apparent to those skilled in the art from a consideration of the following specification and claims.

As the result of various investigations on processes for producing nucleotides by the use of microorganisms, the present inventors have found that significant amounts of 2-thiouridylic acid are accumulated in the cultured liquor by culturing specific bacteria, as explained hereinbelow, in a culture medium prepared by adding 2-thiouracil or 2-thiouridine thereto during any period of time during culturing. The resultant produced and accumulated 2-thiouridylic acid can be obtained in high yield by a recovery process utilizing a strongly basic anion-exchange resin.

The present invention is new to the art. Heretofore, synthetic methods for producing 2-thiouridylic acid have been well known. However, these processes cannot be adapted to an industrial scale manufacturing system because of the high costs and the low yields involved thereing. Moreover, as noted above, the fact that 2-thiouracil may be converted into 2-thiouridylic acid by microorganisms has been known to the art. However, only a small amount of 2-thiouridylic acid is produced inside the cells and no examples or results have been found wherein significant amounts of the objective compound are produced outside the cells. The present invention obviates these factors.

The particular characteristics of the present invention include the addition of 2-thiouracil or 2-thiouridine to the culture liquor and the use of bacteria having the ability of converting 2-thiouracil or 2-thiouridine into 2-thiouridylic acid. Strains having these characteristics belong to the genera Brevibacterium, Corynebacterium, Arthrobacter, Micrococcus and the like.

Either a synthetic culture medium or a natural nutrient medium is suitable in the present invention, as long as it contains the essential nutrients for the growth of the strain employed. Such nutrients are well known in the art and include substances, such as a carbon source, a nitrogen source, inorganic compounds and the like, which are utilized by the microorganism employed in appropriate amounts. Thus, as a carbon source, there may be mentioned, by way of example, carbohydrates such as glucose, fructose, maltose, sucrose, starch, starch hydrolysate molasses, etc., or any other suitable carbon source, such as organic acids, for example, acetic acid, lactic acid, etc. These substances may be used either singly or in mixtures of two or more. As a nitrogen source, various kinds of inorganic or organic salts or compounds, such as urea, liquid ammonia or ammonium salts, such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc., may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

Moreover, in the case of using strains having particular nutritional requirements, substances which satisfy these nutritional requirements should be added to the culture medium. These include substances such as amino acids, vitamins, biotin, etc.

In accordance with the process of the present invention, 2-thiouracil or 2-thiouridine is added to the culture medium employed during the course of fermentation, either all at one time or intermittently. Various concentrations of 2-thiouracil and 2-thiouridine may be used. However, it has been found that a concentration of 0.5 mg./ml. to 10 mg./ml. is preferred for obtaining an excellent conversion rate into 2-thiouridylic acid.

The fermentation or culturing itself is conducted under aerobic conditions, such as aerobic shaking of the culture or with aeration and agitation of a submerged culture, at a temperature of, for example, about 20°–40° C. and at a pH of, for example, about 4.0–9.5. The amount of culturing time is determined by noting the production of 2-thiouridylic acid by analysis. However, significant amounts of 2-thiouridylic acid are generally accumulated in the cultured liquor in 2–8 days.

After the completion of culturing, the 2-thiouridylic acid can be recovered from the cultured liquor advantageously by a conventional ion-exchange method, using a cellulose ion exchanger, for example, DEAE Cephadex (a trade name of the Brown Company, Germany). The isolation of 2-thiouridylic acid from other impurities may be effectively carried out by adsorbing the 2-thiouridylic acid on a strongly basic anion-exchange resin and then eluting the same therefrom with an aqueous solution of an acid or a mixture of an acid and a salt. Strongly basic anion-exchange resins which may be used in such a procedure include a number of various kinds of resins. However, strongly basic polystyrene anion-exchange resins, for example, Dowex 1 or Dowex 2 (trade names of the Dow Chemical Company, U.S.A.), Amberlite IRA–400 (a trade name of the Rohm and Haas Company, U.S.A.), Duolite A–101 (a trade name of the Diamond Alkali Company, U.S.A.), Diaion SK 21 A (a trade name of the Mitsubishi Kasei Company, Japan), and the like, are preferred. Acids to be employed in the elution include hydrochloric acid, sulfuric acid, formic acid, and the like; thus, it can be seen that either inorganic or organic acids can be used. Various inorganic or organic salts, such as sodium chloride, ammonium formate, etc. can be employed as a salt in the elution process.

The 2-thiouridylic acid can then be separately recovered by adsorption with, for example, carbon powder, a cation-exchange resin treatment, concentration, or by precipitation, as desired and as the situation warrants.

The following examples are given merely as illustrative of the present invention and are not to be considered as limiting. Unless otherwise noted, the percentages therein and throughout the application are by weight per liter of water.

EXAMPLE 1

*Brevibacterium ammoniagenes* ATCC 6872 is used as the seed strain. It is cultured in a seed medium containing 2% of glucose, 1% of peptone, 1% of yeast extract, 0.3% of NaCl and 30 μg./l. of biotin at 30° C. for 24 hours in order to obtain a seed culture.

The resultant seed culture is inoculated in the ratio of 10% by volume into a 250 ml. conical flask containing 20 ml. of a fermentation medium having the following composition:

100 g. glucose
6 g. urea
10 g. $KH_2PO_4$
10 g. $MgSO_4 \cdot 7H_2O$
0.1 g. $CaCl_2 \cdot 2H_2O$
30 μg. biotin
10 g. yeast extract These components are dissolved into 1 liter of water, and the pH is adjusted to 8.0 with NaOH. Twenty ml. of the solutions are poured into 250 ml. flasks and are then sterilized at 1 kg./cm.$^2$ for 10 minutes in an autoclave.

Culturing is then carried out with aerobic shaking of the culture at 30° C.

After 72 hours of culturing, 2-thiouracil is added to the fermentation liquor to give a concentration of 3 mg./ml. Culturing is then continued for another 48 hours. As a result, 2.04 mg./ml. of 2-thiouridylic acid is accumulated in the fermentation liquor.

One liter of the solution obtained by removing the bacterial cells from the fermentation liquor is adjusted to a pH of 8.0 with sodium hydroxide and is passed through a column filled with the strongly basic polystyrene anion-exchange resin Dowex #1X2 (Cl type, 200–400 mesh) in order to adsorb 2-thiouridylic acid on the resin. The resin is washed with water. Thereafter, elution with 0.01 N-HCl, 0.02 N-HCl, 0.05 N-HCl and 0.1 N-HCl is carried out in the order listed. The fractions of 2-thiouridylic acid eluted with 0.1 N-HCl are concentrated to dryness, dissolved in water and passed through a column of Dowex 50 (H+). The resultant eluate is concentrated and ethanol is added thereto in order to precipitate 2-thiouridylic acid. The eluate is filtered, and the precipitate is dried and recovered. The yield of product is 0.8 g., having a purity of 80%. A pure 2-thiouridylic acid product is obtained by treatment with carbon powder and recrystallization from water and ethanol.

It was confirmed that impurities, such as inorganic salts, thiouracil, small amounts of other nucleotides, and other colored substances, existing in the fermentation liquor, may be eliminated by treatment with Dowex #1X2 (Cl type).

EXAMPLE 2

Example 1 is repeated, except that *Corynebacterium sp.* No. 3485 ATCC 21084 is used as the seed strain. The amount of 2-thiouridylic acid produced in the resultant cultured liquor is 1.8 mg./ml.

EXAMPLE 3

Using the same media and culturing conditions described in Example 1, fermentation is carried out using *Arthrobacter sp.* No. 3486 ATCC 21085 as the seed strain. The amount of 2-thiouridylic acid produced in the resultant cultured liquor is 1.8 mg./ml.

EXAMPLE 4

*Micrococcus sodonensis* ATCC 15932 is used as the seed strain, instead of *Brevibacterium ammoniagenes* ATCC 6872, but otherwise the procedure of Example 1 is repeated, using the same conditions of culturing. The amount of 2-thiouridylic acid produced in the cultured liquor as a result of the fermentation is 1.3 mg./ml.

EXAMPLE 5

The procedure of Example 1 is again repeated, except that 2-thiouridine is added to the medium instead of 2-thiouracil. The media used and the conditions of culturing are otherwise the same as in Example 1. The amount of 2-thiouridylic acid produced in the resultant cultured liquor is 1.3 mg./ml.

While certain specific microorganism strains advantageously employed in the present invention have been described in the working examples, it is to be understood that strains capable of producing 2-thiouridylic acid and which belong to the *Brevibacterium, Corynebacterium, Arthrobacter* or *Micrococcus* genus can be used. Other examples of strains possessing this property include: *Brevibacterium ammoniagenes* ATCC 6871, ATCC 15750, ATCC 15751, *Corynebacterium mycetoides* ATCC 21134, *Arthrobacter citreus* ATCC 11624.

The invention being thus described, it will be obvious that the same may be varied in many ways. Such variations are not to be regarded as a departure from the spirit and scope of the invention, and all such modifications are intended to be included within the scope of the following claims.

We claim:
1. A process for producing 2-thiouridylic acid which comprises culturing a microorganism capable of producing 2-thiouridylic acid and belonging to a genus selected from the group consisting of *Brevibacterium, Corynebacterium, Arthrobacter* and *Micrococcus* under aerobic conditions in an aqueous nutrient medium containing 2-thiouracil or 2-thiouridine as an additive, accumulating 2-thiouridylic acid in the resultant cultured liquor, and recovering said 2-thiouridylic acid therefrom.

2. The process of claim 1, wherein said additive is added to the medium at the initiation of culturing.

3. The process of claim 1, wherein said additive is added all at one time to the medium during the course of culturing.

4. The process of claim 1, wherein said additive is added intermittently to the medium during the course of culturing.

5. The process of claim 1, wherein said additive is employed in an amount of from about 0.5 to 10 mg./ml.

6. The process of claim 1, wherein culturing is carried out at a temperature of about 20° to 40° C. and at a pH of about 4.0 to 9.5.

7. The process of claim 1, wherein said 2-thiouridylic acid is isolated from the cultured liquor and from impurities by an ion-exchange resin treatment.

8. A process for producing 2-thiouridylic acid which comprises culturing a microorganism selected from the group consisting of *Brevibacterium ammoniagenes* ATCC 6872, *Corynebacterium sp.* ATCC 21084, *Arthrobacter sp.* ATCC 21085 and *Micrococcus sodonensis* ATCC 15932 under aerobic conditions in an aqueous nutrient medium containing 2-thiouracil or 2-thiouridine as an additive, accumulating 2-thiouridylic acid in the resultant cultured liquor, and recovering said 2-thiouridylic acid therefrom.

9. The process of claim 8, wherein said additive is employed in an amount of from about 0.5 to 10 mg./ml.

10. The process of claim 8, wherein culturing is carried out at a temperature of about 20° to 40° C. and at a pH of about 4.0 to 9.5.

References Cited
UNITED STATES PATENTS 3,296,088   1/1967   Kinoshita et al. _____ 195—28N ALVIN E. TANENHOLTZ, Primary Examiner